(12) United States Patent
Riordan et al.

(10) Patent No.: US 8,281,033 B1
(45) Date of Patent: Oct. 2, 2012

(54) TECHNIQUES FOR PATH SELECTION

(75) Inventors: Patrick Brian Riordan, West Newtown, MA (US); Harold M. Sandstrom, Belmont, MA (US); Helen S. Raizen, Jamaica Plain, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 81 days.

(21) Appl. No.: 12/803,498

(22) Filed: Jun. 29, 2010

(51) Int. Cl.
*G06F 15/173* (2006.01)
(52) U.S. Cl. ......... 709/238; 709/232; 709/231; 709/243
(58) Field of Classification Search .................. 709/238, 709/232, 231, 243
See application file for complete search history.

(56) References Cited

U.S. PATENT DOCUMENTS

| | | | |
|---|---|---|---|
| 6,434,637 B1 | 8/2002 | D'Errico | |
| 2008/0267209 A1* | 10/2008 | Gallagher et al. | 370/429 |
| 2009/0019157 A1* | 1/2009 | Suman et al. | 709/225 |
| 2010/0185794 A1* | 7/2010 | Belyakov et al. | 710/38 |

OTHER PUBLICATIONS http://www.probsolvesolutions.co.uk/solutions/white_papers/emc/Emc_powerpath_with_symmetrix_clariion.pdf, EMC PowerPath with Symmetrix and CLARiiON Storage Systems, Jun. 2006, EMC Corporation.
U.S. Appl. No. 12/798,035, filed Mar. 29, 2010, Techniques for Use With Memory Partitioning and Management.
U.S. Appl. No. 12/798,034, filed Mar. 29, 2010, Techniques for Global Memory Management and Request Processing.

* cited by examiner

*Primary Examiner* — Lan-Dai T Truong
(74) *Attorney, Agent, or Firm* — Muirhead and Saturnelli, LLC

(57) ABSTRACT

Described are techniques for performing path selection. A data operation is received for a metadevice comprising a plurality of metadevice members. A first of the plurality of metadevice members is determined. The first member is the member to which the data operation is directed. In accordance with a load balancing technique for the first metadevice member, path selection is performed to select a first of a plurality of paths. The metadevice is accessible over each of the plurality of paths. The data operation is sent over the first path.

20 Claims, 12 Drawing Sheets

| Metadevice size=30 | |
|---|---|
| LV | Host LBA Range |
| 5 | 1-10 |
| 6 | 11-20 |
| 10 | 21-30 |

| I/O ID | Host LBA | Metadevice member mapping | Path selection |
|---|---|---|---|
| a | 5 | LV5 | FA1 |
| b | 14 | LV6 | FA1 |
| c | 21 | LV10 | FA1 |
| d | 6 | LV5 | FA2 |
| e | 7 | LV5 | FA3 |
| f | 27 | LV10 | FA2 |
| g | 25 | LV10 | FA3 |

FIGURE 6A

TECHNIQUES FOR PATH SELECTION

BACKGROUND

1. Technical Field

This application generally relates to data storage, and more particularly to techniques used for path selection when communicating with a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

A host may communicate with a data storage system when performing a data operation such as, for example, to read or write data to a storage device. The host may be able to transmit the data operation to the data storage system over any one or more different paths. In the case where there are multiple possible paths, the host may perform processing using any one of a variety of different techniques to determine which path to select for transmitting the data operation.

SUMMARY OF THE INVENTION

In accordance with one aspect of the invention is a method for performing path selection. A data operation is received for a metadevice comprising a plurality of metadevice members. A first of the plurality of metadevice members to which the data operation is directed is determined. In accordance with a load balancing technique for the first metadevice member, path selection is performed to select a first of a plurality of paths, wherein the metadevice is accessible over each of the plurality of paths. The data operation is sent over the first path. The load balancing technique may perform load balancing for each of the plurality of metadevice members independent of all others of said plurality of metadevice members. The load balancing technique may perform any of round robin selection and adaptive load balancing for each metadevice member. The adaptive load balancing for said each metadevice member may include one or more criteria related to a characteristic of queued I/O operations directed to said each metadevice member on each path. Data stored on the metadevice may not be striped across the plurality of metadevice members. Alternatively, the data stored on the metadevice may be striped across the plurality of metadevice members. Each of the plurality of metadevice members may be logical volumes. One or more preferred paths from the plurality of paths may be determined for at least one of the plurality of metadevice members. Each of said one or more preferred paths for said at least one metadevice member may be selected for transmitting a data operation to the at least one metadevice member more frequently than others ones of said plurality of paths which are not included in said one or more preferred paths. At least one of the one or more preferred paths may include a director located on a same physical board as device descriptor information for said at least one metadevice member. The device descriptor information may be stored in a portion of global memory located on the same physical board as the director. The director and metadevice may be included in a data storage system. The data operation may be sent from a host to a data storage system and the data operation may include a first logical address representing a logical address used by the host. The method may further include mapping, prior to said sending, said first logical address to a second logical address, said second logical address being used by the data storage system and identifying said first metadevice member and an offset in said first metadevice member. The data operation may be received by a director of the data storage system included in the first path and the director may place the data operation in a command queue associated with the first metadevice member. The load balancing technique may use criteria in selecting said first path where the criteria includes which of said plurality of paths were previously used in sending data operations directed to said first metadevice member. The first path may be selected without considering which of said plurality of paths were previously used in sending data operations directed to others of said plurality of metadevice members. The criteria may include a weight associated with each of said plurality of paths. Path selection of the first path for transmitting said data operation for said first metadevice member may be performed independently of path selection in accordance with said load balancing technique to select one of said plurality of paths for transmitting a data operation for a second of the plurality of metadevice members.

In accordance with another aspect of the invention is a computer readable medium comprising code stored thereon for performing path selection, the computer readable medium comprising code for: receiving a data operation for a metadevice, said metadevice comprising a plurality of metadevice members included in a data storage system; determining that the data operation is directed to a first of the plurality of metadevice members; selecting a first of a plurality of paths over which the metadevice is accessible, wherein said selecting is performed using a load balancing technique that selects said first path in accordance with criteria including when each of said plurality of paths was last used in transmitting data operations for the first metadevice member, wherein said selecting of the first path for the data operation directed to the first metadevice member is performed without considering which of said plurality of paths were used in transmitting data operations for others of said metadevice members; and sending the data operation over the first path to the data storage system. Each of the plurality of paths may have a corresponding time indicating when said each path was last used in transmitting a data operation for said first metadevice member. The criteria may include an ordering of said plurality of paths based on a relative ordering of the corresponding times for said plurality of paths and a weight associated with each of said paths, said weight being determined in accordance with said first metadevice member.

In accordance with another aspect of the invention is a system comprising: a data storage system including a metadevice comprising a plurality of metadevice members; and a host including a computer readable medium with code stored thereon for: receiving a data operation for the metadevice; determining that the data operation is directed to a first of the plurality of metadevice members; performing path selection to select a first of a plurality of paths over which the metadevice is accessible, wherein said path selection uses a load balancing technique that selects said first path in accordance with when each of said plurality of paths was last used in transmitting data operations for the first metadevice member to the data storage system and without considering which of said plurality of paths were used in transmitting data operations for others of said metadevice members to the data storage system; and sending the data operation over the first path to the data storage system.

BRIEF DESCRIPTION OF THE DRAWINGS

Features and advantages of the present invention will become more apparent from the following detailed description of exemplary embodiments thereof taken in conjunction with the accompanying drawings in which:

FIG. 6A is an example of a metadevice and I/O operations illustrating use of the techniques herein for path selection;

DETAILED DESCRIPTION OF EMBODIMENT(S)

Figure 1:
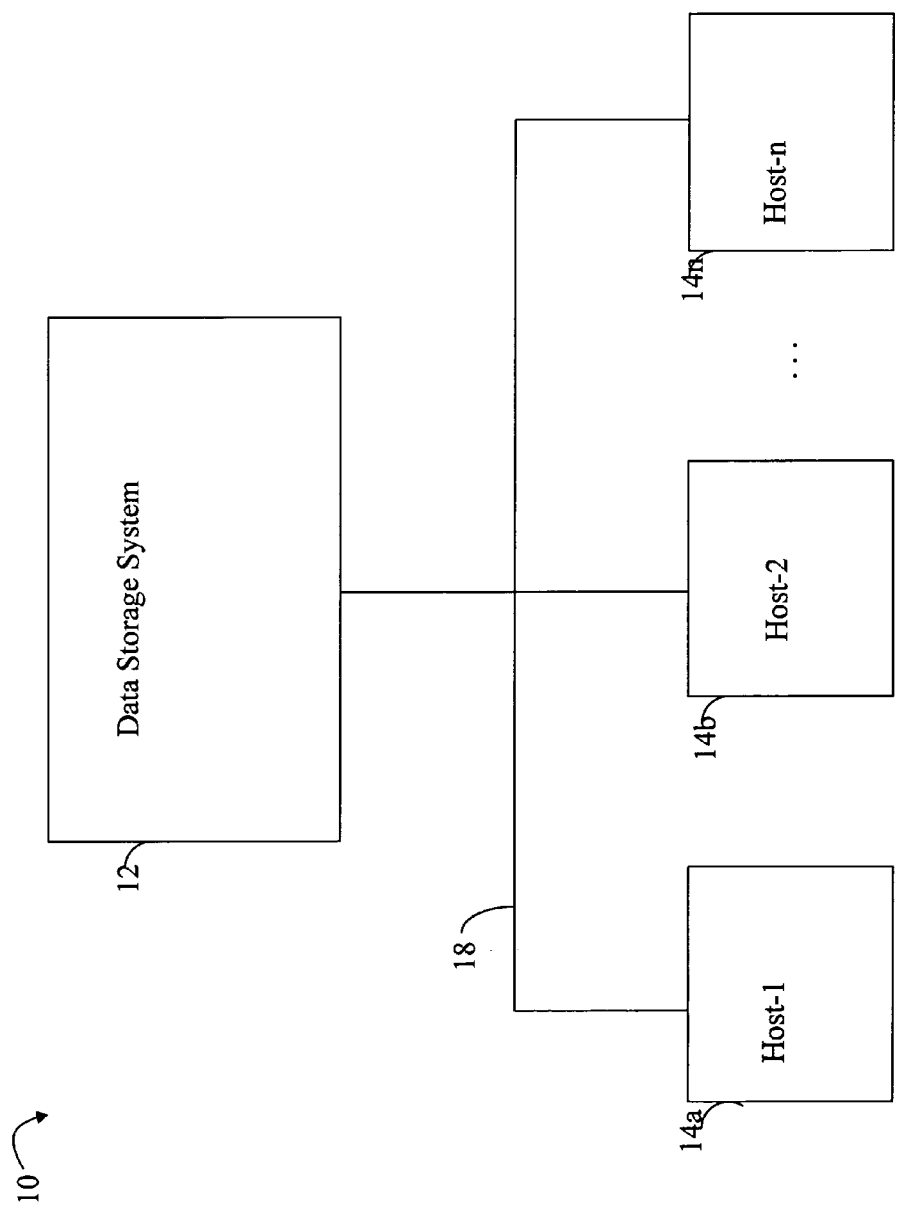
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP, SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
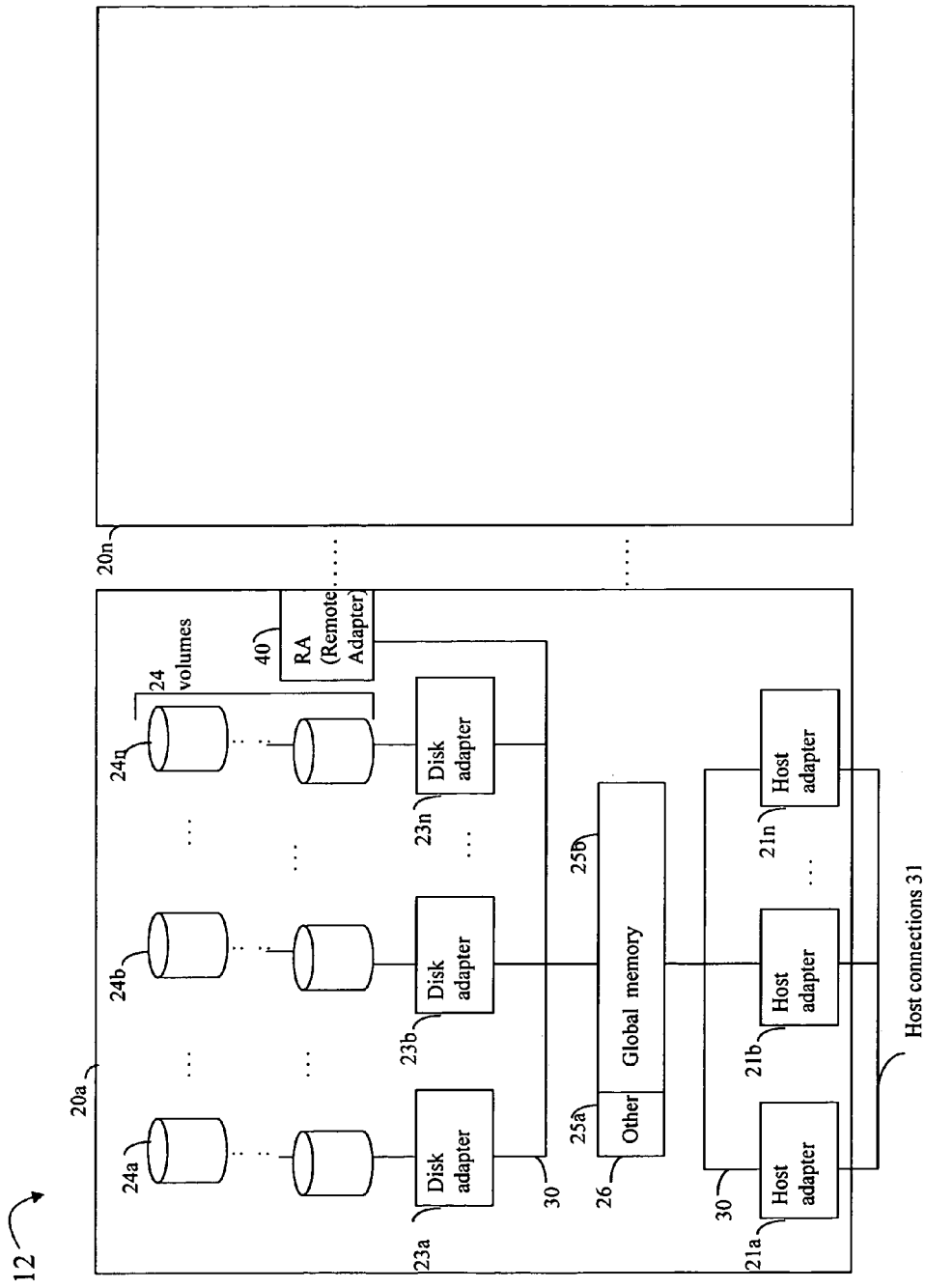
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component, such as a DA, may be characterized as a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon. A LUN or logical unit number may be characterized as a disk array or data storage system reference to an amount of disk space that has been formatted and allocated for use to one or more hosts. An LV may further map, for example, to a single LUN, more than one LUN, and/or a portion of a LUN.

The DA performs I/O operations on a disk drive. Data residing on an LV may be accessed by the DA following a data request in connection with I/O operations that other directors originate.

Figure 2B:
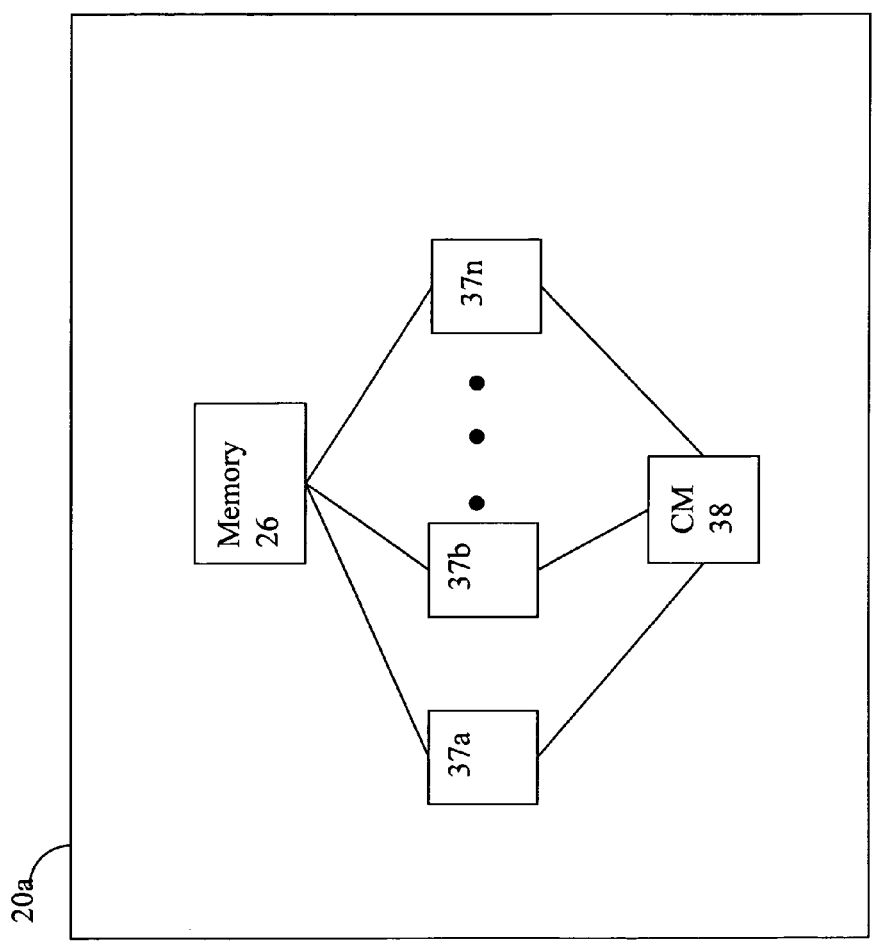
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on an LV of a data storage system, using one or more different physical paths from the host to the data storage system. Described in the following paragraphs are techniques that may be used in connection with selecting a path over which to access data of a storage device when such data is accessible over multiple paths. A host may use such techniques in connection with path selection when communicating data operations, such as I/O operations, to the data storage system.

Figure 3:
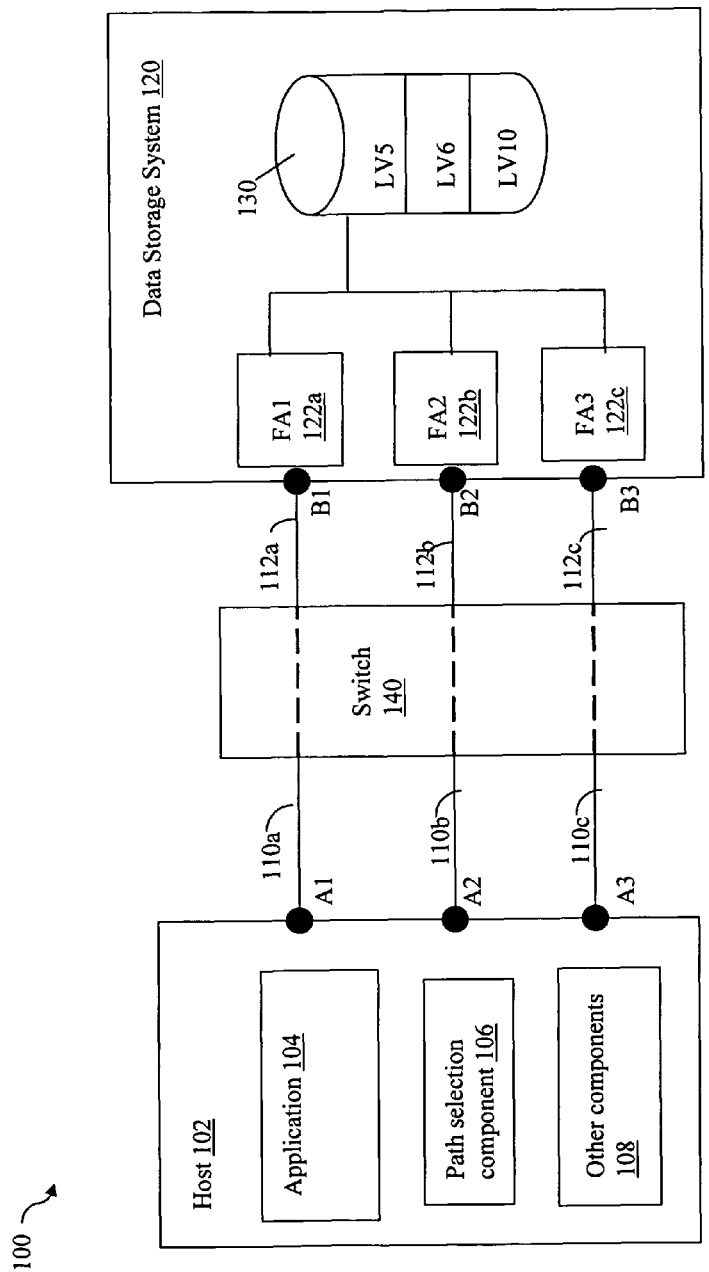
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. It should be noted that the example 100 includes only a single host, single data storage system, and a fabric including a single switch for purposes of simplicity to illustrate the techniques herein.

The host 102 may include an application 104, path selection component 106 and other components 108. An I/O operation from the application 104 may be communicated to the data storage system 120 using the path selection component 106 and one or more other components represented by element 108. The application 104 may be a database or other application which issues data operations, such as I/O operations, to the data storage system 120. Each of the I/O operations may be directed to a target device (such as device 130) configured to be accessible to the host 102 over multiple physical paths. As such, each of the I/O operations may be forwarded from the application 104 to the data storage system 120 over one of the possible multiple paths. The path selection component 106 may perform processing to select one of the possible multiple paths based on one or more criteria. For example, in one embodiment, the criteria may include load balancing. The component 106 may perform a load balancing technique in connection with path selection to distribute I/O requests for the target device across available active paths. Load balancing may be performed to provide for better resource utilization and increased performance of the host, data storage system, and network or other connection infrastructure. The path selection component 106 may be included a commercially available product such as, for example, EMC® PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the path selection component 106 and also below the path selection component 106. For example, application 104 may issue an I/O operation which is communicated in a call stack including an LVM, the path selection component 106, and an FC or SCSI driver.

The data storage system 120 includes three FAs 122a-122c and a storage device 130. In this example, the device 130 may include three LVs—LV5, LV6, and LV10. The device 130 may be configured as a single metadevice including three LVs. A metadevice may be more generally characterized as a logical device including one or more other logical devices or volumes. The metadevice is an aggregated device configuration accessible by the host over a connection or path to the data storage system as a single unit. The host or other user of the metadevice is able to access all LVs thereof as a single unit using a metadevice identifier. Each of the LVs included in the metadevice may be generally referred to as a metadevice member or extent. The host may not be able to access each of the individual metadevice members over a path between the data storage system and may rather only be able to access the metadevice as a single aggregated unit. For example, if LV5, LV6 and LV10 are each 100 GBs, the metadevice has a total capacity of 300 GBs. To the host, the metadevice is accessible as a single logical storage device having 300 GBs of storage capacity. In one embodiment, a single LV of the metadevice may be designated as the metahead or exposed member associated with an address and/or other identifier visible to the host. As such, the host may access the metadevice as a single aggregated unit using the identifier associated with exposed metahead. For example, LV5 may be designated as the metadevice metahead member and the host may access the metadevice using the identifier for LV5. It should be noted that the metadevice may be further configured such as, for example, by associating one or more additional LVs with the metadevice thereby adding the one or more other LVs to the metadevice 130. For example, at a later point in time (not illustrated in FIG. 3), metadevice 130 may have its storage capacity expanded by adding LV90. The metadevice 130 may be represented as having storage for LV90 following LV10 (e.g., first storage location of LV90 logically follows last storage location of LV10). It should be noted that each of the LVs may be located on a same physical device or one or more different physical devices. Also, each FA may have one or more ports through which the metadevice may be accessible although only one such port of each FA is used in the illustrated example. For example, suppose that metadevice 130 is accessible through 2 ports of FA1 122a rather than 1 port of FA1 122a as illustrated. In this case, metadevice 130 may be accessible over a fourth path from A1 to the second additional port of FA1 122a.

In the example 100, the metadevice 130 is configured to be accessible through a port of the three front end directors or interfaces 122a-122c, also denoted respectively FA1, FA2 and FA3. The multiple paths allow the application I/Os to be routed over multiple paths and, more generally, allow the metadevice 130 to be accessed over multiple paths. In the event that there is a component failure in one of the multiple paths, application I/Os can be easily routed over other alternate paths unaffected by the component failure. Thus, an embodiment of the path selection component 106 may also perform other processing in addition to load balancing in connection with path selection. The component 106 may be aware of, and may monitor, all paths between the host and the metadevice 130 in order to determine which of the multiple paths are active or available at a point in time, which of the multiple paths are unavailable for communications, and to use such information to select a path for host-data storage system communications.

In the example 100, the metadevice 130 may be configured as accessible through three paths. Each path may be represented by two path endpoints—a first endpoint on the host 102 and a second endpoint on the data storage system 120. The first endpoint may correspond to a port of a host component, such as a director on the host 102, and the second endpoint may correspond to a port of a data storage system component, such as a port of an FA of the data storage system 120. In the example 100, elements A1, A2 and A3 each denote a port of a host 102 (e.g. such as a port of a host bus adapter or HBA), and elements B1, B2 and B3 each denote a port of an FA of the data storage system 120. The metadevice 130 may be accessible over a first path represented by A1-B1, a second path represented by A2-B2 and a third path represented by A3-B3.

As described in more detail in following paragraphs and figures, the techniques herein may be performed by the path selection component 106 to select one of the foregoing three paths when sending an I/O operation from the application 104 to the metadevice 130. In making such a selection in an embodiment in accordance with techniques herein, the component 106 may also use additional information about the metadevice members. The component 106 may use this additional information about the metadevice and its members in order to perform the mapping as described below n connection with FIG. 4. Based on the result of this mapping, the component 106 may determine the particular metadevice member to which an I/O operation is directed and use a load balancing technique to select a path.

Figure 4:
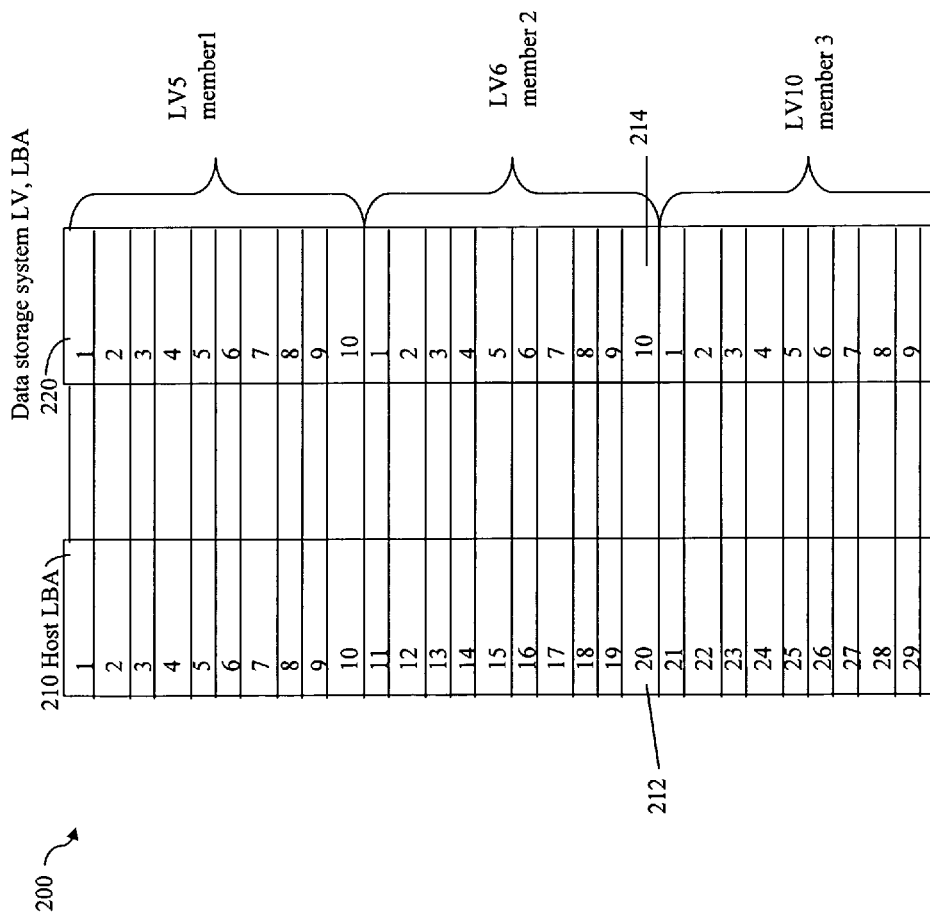
FIG. 4 is an example illustrating mapping that may be performed in connection with path selection in an embodiment in accordance with techniques herein.

Referring to FIG. 4, shown is an example illustrating metadevice logical addressing from a host's view point and a data storage system's view point. The example 200 includes a column 210 representing a host's viewpoint or logical block address (LBA) range for the metadevice 130 and a column 220 representing LVs and LBA ranges for the metadevice 130 from the data storage system's view point. Each entry in 210 (host LBA) has a corresponding entry in column 220 (data storage system LVn, LBA) representing a logical address mapping for the metadevice between a host and a data storage system.

Recall that a host views the metadevice 130 as a single unit having a single LBA range spanning the entire metadevice. This host viewpoint and metadevice LBA range is represented by the LBA range of column 210. The foregoing viewpoint represents the fact that the host accesses the metadevice as a single logical unit or entity over a connection to the data storage system. For example, in one embodiment in accordance with techniques herein, a metadevice is accessible as a single addressable unit over an FC connection between the host and data storage system. When the FA receives an I/O request for a metadevice, the receiving FA performs processing to map or translate the location in the I/O request as specified by the host's metadevice LBA to a corresponding metadevice extent or member (e.g., an LV), and an address or offset within that member as represented by column 220. In this example, the metadevice 130 includes LV5, LV6, and LV10, where each of the foregoing LVs has a capacity of 10 logical blocks, and the metadevice 130 has a total capacity of 30 logical blocks (e.g., LBA range from 1 to 30 inclusively as represented in 210). I/O requests from the application may identify the metadevice as the target using LV5 and may specify a location or offset within the metadevice to which the I/O is directed. The location or offset of the I/O request may specify an LBA in the inclusive range from 1 to 30. The receiving FA translates the I/O request location as represented by the host LBA (as indicated in a row of column 210) to a corresponding LV and offset or location (as indicated by the same row in column 220), where the LV is the metadevice member or extent, and the LBA represents the offset or location within the member or extent.

To further illustrate, consider an example where an FA receives an I/O request for reading data from a location of the metadevice 130. The I/O request may specify that data is read from LV5 at a location corresponding to host LBA 20. In this case, 212 represents the information as may be included in such an I/O request. The FA maps the host LBA to a corresponding data storage system LBA such as represented by entry 214 of column 220.

In accordance with the example 200 of FIG. 4 using 1-based logical block addressing where the host LBA range (e.g., 1-30) is represented as a concatenation of the address ranges of each metadevice member (e.g., LV5, 6 and 10) and each metadevice member is a same size (e.g., 10 blocks), the mapping of host LBA 210 to a corresponding metadevice "member id, offset" may be generalized. In particular, the determination of the "member id" from the host LBA may be represented as:

Member id=INT_QUOTIENT [((Host LBA−1)/#LBAs per member)]+1 where

"member id" is the metadevice member or extent identifier of 1, 2 or 3 corresponding, respectively, to member LVs 5, 6 and 10; and INT_QUOTIENT represents the integer value of the quotient of the indicated division operation. It should be noted that INT_QUOTIENT is not the result of rounding up but rather rounds down to the nearest integer.

The determination of the LBA or offset within the "member id" may be generally represented as the mathematical modulus or remainder:

MODULUS [((Host LBA−1)/#LBAs per member)]+1

It will be appreciated by those skilled in the art that an embodiment may more generally perform the mapping formulaically for variations of the example herein such as, for example, when metadevice members are of varying sizes.

As will be described in more detail in following paragraphs, an embodiment in accordance with techniques herein may also have the path selection component 106 of FIG. 3 perform processing to determine, for a host LBA of 210, a corresponding metadevice member and LBA or offset within the member, as represented by 220.

Figure 5:
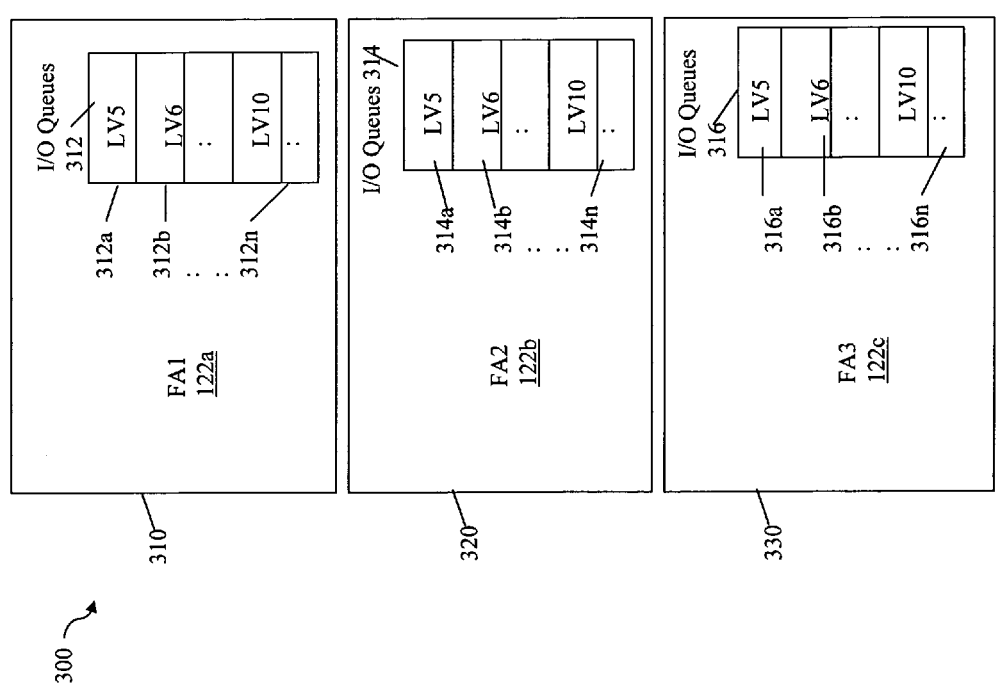
FIG. 5 is an example illustrating command queues of a data storage system that may be used in connection with techniques herein.

Referring to FIG. 5, shown is an example representation of some of the resources of the data storage system 120 that may be used in connection with the techniques herein. The example 300 illustrates resources of each of the FAs 122a-122c that may be allocated for use with the metadevice 130. As noted in the example above with reference to FIG. 3, the metadevice 130 includes three LVs—LV5, LV6 and LV10—and is accessible through a port of each of the FAs 122-122c. The data storage system 120 may associate an I/O or command queue with each LV, or more generally, each member or extent, of the accessible metadevice 130. Furthermore, each FA through which the metadevice may be accessed may allocate I/O or command queue resources for each LV of the metadevice. For example, element 310 illustrates that FA1 122a may include multiple I/O queues 312 and may associate an I/O queue of 312 with each of LV5, LV6 and LV10. More generally, element 312 represents multiple I/O queues, denoted 312a-312n, where each such I/O queue is associated with a single LV having data accessible using FA 1 122a. For example, element 312a represents the I/O queue of I/O requests received by FA1 for LV5, element 312b represents the I/O queue of I/O requests received by FA1 for LV6, and so on. Similarly, element 314 represents multiple I/O queues, denoted 314a-314n, where each such I/O queue is associated with a single LV having data accessible using FA2 122b. Element 316 represents multiple I/O queues, denoted 316a-316n, where each such I/O queue is associated with a single LV having data accessible using FA3 122c. In one embodiment each I/O queue of 312, 314 and 316 associated with an LV may have up to a maximum number of entries, where each such entry may correspond to an outstanding I/O or data operation for the associated LV.

When the host sends an I/O request to the data storage system for a metadevice, the I/O request is directed to the metahead of the metadevice since only the metahead is accessible as an addressable entity over the path. In other words, only the metahead has a visible address or identifier to which the host can direct the metadevice I/O request. For example, LV5 may be the metahead for metadevice 130. I/O requests from the host for metadevice 130 may indicate LV5 as the target device for the metadevice even though such requests may be to access storage of LV6 or LV10. As represented in the example 200 of FIG. 4, each I/O request from the host for metadevice 130 may also specify an offset or location as an LBA within the inclusive range of 1 to 30. Each such I/O request may be sent on a selected one of the three paths and sent to a selected one of the FAs 122a-122c. The receiving FA may then perform processing as described above in connection with FIG. 4 to map the host LBA of 210 to a corresponding metadevice location, as represented by 220, using metadevice member (e.g., LV) and LBA or offset within the member. The receiving FA may then place the I/O request in the appropriate I/O queue of the metadevice member or extent as determined by the mapping of 220. For example, suppose the I/O request includes information as represented by element 212 of FIG. 4 and indicates LV5 as the I/O device with a host LBA=20. With reference back to FIG. 3, the path selected for I/O request transmission is the path from A1 to B1 where FA1 122a receives the I/O request. The FA 122a receives the I/O request and performs processing to map the metadevice logical address from the host's viewpoint (e.g., host LBA as specified in the I/O request) to a corresponding metadevice logical address from the data storage system's viewpoint (e.g., metadevice member or extent and LBA or offset within the member). In accordance with FIG. 4, the FA 122a determines a corresponding metadevice logical address used by the data storage system as represented by 214. Based on element 214, FA 122a determines that the I/O operation identifies a location included in LV6, and places the I/O request in the I/O queue 312b for LV6.

In a similar manner to that as described above, for each received I/O request, each FA of the data storage system performs processing to map a logical address for a metadevice from a host's viewpoint (as specified in the I/O request) to a corresponding logical address for the metadevice from the data storage system's viewpoint. The corresponding logical address as used by the data storage system identifies a metadevice member or extent and the FA places the I/O request in the I/O queue for the metadevice member.

In accordance with techniques herein, processing may be performed by the path selection component 106 to perform member or extent-based load balancing for a metadevice. Such techniques also attempt to maximize usage of resources, such as the I/O queues of the FAs in the data storage system. As will be described in following paragraphs, an embodiment in accordance with the techniques herein may provide for the path selection component 106 determining, for an I/O operation directed to a metadevice, to which metadevice member or extent the I/O operation is directed. A load balancing technique may then be used to select a path based on the metadevice member or extent to which the I/O operation is directed. In one embodiment, a path for a metadevice member may be selected using a round robin technique although an embodiment may more generally use others in accordance with criteria and techniques described herein besides round robin.

An embodiment in accordance with techniques herein may access or otherwise address a metadevice as a single logical unit with respect to sending I/O operations to a data storage system as described above. In such an embodiment a host or other entity sending an I/O operation may also obtain and use additional information about the underlying metadevice such as, for example, related to various aspects about the metadevice members described in connection with FIG. 4. The additional information may be used, such as by the path selection component 106 of FIG. 3, in connection with path selection even though the host addresses or accesses the metadevice over each path as a single logical unit (e.g., entire metadevice has a single FC address). In accordance with the techniques herein, the path selection component 106 may obtain information about the metadevice and its members in order to determine the mapping as described in connection with FIG. 4. The component 106 may then use this mapping in connection with path selection for transmission of an I/O operation to the data storage system.

Round robin generally refers to a technique of selecting each possible path in rotation. With reference back to FIG. 3, what will be described is an example illustrating use of techniques herein for path selection as may be performed by the path selection component 106 when selecting a path for transmitting an I/O operation, such as from the application 104 of the host 102, to the metadevice 130 of the data storage system 120. In this example, the application 104 may have multiple I/O operations directed to the metadevice 130.

Referring to FIG. 6A, shown is an example illustrating metadevice and I/O operation information in accordance with techniques herein. The example 400 indicates that the metadevice 130 may have a configuration as represented by 410 and described above. As represented by 410, the metadevice includes three LVs—LV5, LV6 and LV10—having a host LBA range of 1-30. Each I/O request may identify the metadevice, such as using LV5, as the device to which the I/O operation is directed, and a location or offset within the metadevice. The location or offset may represent an LBA in the host LBA range such as illustrated in 210 of FIG. 4. The table 420 represents information for 7 I/O operations directed to the metadevice. Each row of table 420 includes information for a single I/O operation. Column 424 includes an I/O ID (identifier) for each I/O operation and may be used for purposes of reference herein to identify a particular one of the I/O operations. Column 426 includes host LBAs for the I/O operations. Column 428 specifies metadevice members. For an I/O operation described by a row of table 420, column 426 specifies a host LBA (in the range of 210 of FIG. 4) and column 428 specifies a corresponding metadevice member as may be determined by the mapping described and illustrated in FIG. 4. In particular, the host LBA of column 426 is mapped to a logical address as used by the data storage system, where the logical address as used by the data storage system is represented as a metadevice member or extent and an offset or LBA within that member. Column 428 corresponds to the metadevice member or extent for the mapped logical address as used by the data storage system. Each of the I/O operations of table 420 are sent from the host 102 to the data storage system 120 over one of the three possible paths described above in connection with FIG. 3—a first path A1-B1 using FA1 122a, a second path A2-B2 using FA2 122b and a third path A3-B3 using FA3 122c. For a given row of the table 420 describing an I/O operation for the metadevice, column 430 identifies the FA of the selected path upon which the I/O operation is transmitted.

In accordance with techniques herein, the metadevice member or LV to which the I/O operation is directed is determined. The path selected may be based on a round robin rotation through all possible paths for the metadevice member. For each metadevice member, the path selection component tracks which paths have been selected so that subsequent I/O operations directed to a particular metadevice member are distributed over the possible paths. For example, I/O operation "a" represented by entry 422 is directed to metadevice member LV5 and the first path using FA1 is selected. At a later time, I/O operation "d" directed to metadevice member LV5 and represented by entry 424 is performed and the second path using FA2 is selected. At yet a later time, I/O operation "e" directed to metadevice member LV5 and represented by entry 426 is performed and the third path using FA3 is selected.

With respect to I/O operations directed to metadevice member LV6, I/O operation "b" is performed and the first path using FA1 is selected. Although not illustrated in the exemplary series of I/O operations depicted by table 420, a next I/O operation directed to metadevice member LV6 results in selecting the second path using FA2 in accordance with round robin rotation through possible paths for each metadevice member. With respect to I/O operations directed to metadevice member LV10, I/O operation "c" is performed and the first path using FA1 is selected. At a later time, I/O operation "f" directed to metadevice member LV10 is performed and the second path using FA2 is selected. At yet a later time, I/O operation "g" directed to metadevice member LV10 is performed and the third path using FA3 is selected. Thus, each of the three paths is selected in a round robin fashion for successive I/O operations directed to a particular metadevice member. The host may maintain state information per metadevice member recording which path to select next based on a round robin rotation over the possible paths. It should be noted that such round robin rotation may be performed per metadevice member independent of other metadevice members. For example, the round robin rotation over all possible three paths with respect to metadevice LV5 is independent of the round robin rotation over all three possible paths with respect to metadevices LV6 and LV10.

Figure 6B:
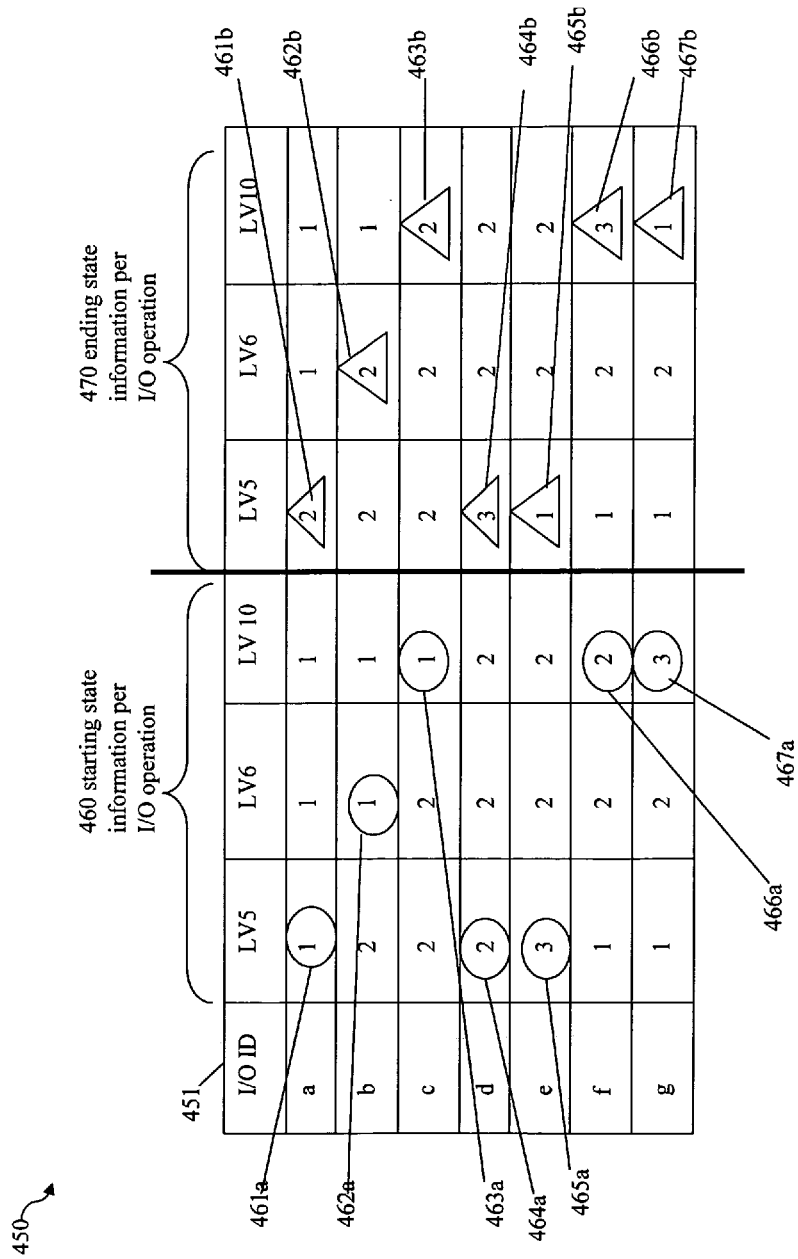
FIG. 6B is an example representation of state information that may be used in an embodiment in accordance with techniques herein for path selection.

Referring to FIG. 6B, shown is an example of state information as may be maintained by the path selection component in an embodiment in accordance with techniques herein. The example 450 illustrates state information as may be recorded and used by the path selection component in connection with processing the I/O operations denoted "a" through "g" in table 420 of FIG. 6A. The example 450 includes a row of state information for each I/O operation denoted by the I/O ID of column 451. The columns of 460 and 470 represent state information that may be maintained for path selection. For an I/O operation represented by a row of 450 for which a path selection is made, columns of 460 may represent the state information used to select a path for transmitting the I/O operation and columns of 470 may represent the state information of 460 as modified or updated after the I/O operation is transmitted. For the I/O operation represented by a row of 450, the path of 460 selected is indicated by a circled identifier which has its state information modified to a value indicated by an element of 470 in the same row within a triangle. For example, for I/O operation "a" directed to LV5, the first path as indicated by state information 461a is selected. The state information 461a is then updated to 461b to indicate that the next I/O request directed to LV5 should be transmitted over the second path. For I/O operation "b" directed to LV6, the first path as indicated by state information 462a is selected. The state information 462a is then updated to 462b to indicate that the next I/O request directed to LV6 should be transmitted over the second path. For I/O operation "c" directed to LV10, the first path as indicated by state information 463a is selected. The state information 463a is then updated to 463b to indicate that the next I/O request directed to LV10 should be transmitted over the second path.

For I/O operation "d" directed to LV5, the second path as indicated by state information 464a is selected. The state information 464a is then updated to 464b to indicate that the next I/O request directed to LV5 should be transmitted over the third path. For I/O operation "e" directed to LV5, the third path as indicated by state information 465a is selected. The state information 465a is then updated to 465b to indicate that the next I/O request directed to LV5 should be transmitted over the first path. Thus, the I/O requests for metadevice member LV5 are rotated in a round robin manner through each of the 3 possible paths. For I/O operation "f" directed to LV10, the second path as indicated by state information 466a is selected. The state information 466a is then updated to 466b to indicate that the next I/O request directed to LV10 should be transmitted over the third path. For I/O operation "g" directed to LV10, the third path as indicated by state information 467a is selected. The state information 467a is then updated to 467b to indicate that the next I/O request directed to LV10 should be transmitted over the first path. Thus, the I/O requests for metadevice member LV10 are rotated in a round robin manner through each of the 3 possible paths. It should be noted that in this example, each of the 3 possible paths is active and available for transmission and denoted, respectively, as 1, 2 and 3 in FIG. 6B.

An embodiment may store path selection state information for each metadevice member using other representations than as illustrated in 450. It should be noted that, for a given row "n" of 450, information of columns 470 represents the starting state information of columns 460 in row "n+1" of 450. Such information has been repeated in 450 to illustrate the starting and ending (or modified) path selection state information with respect to processing an I/O operation.

Figure 7:
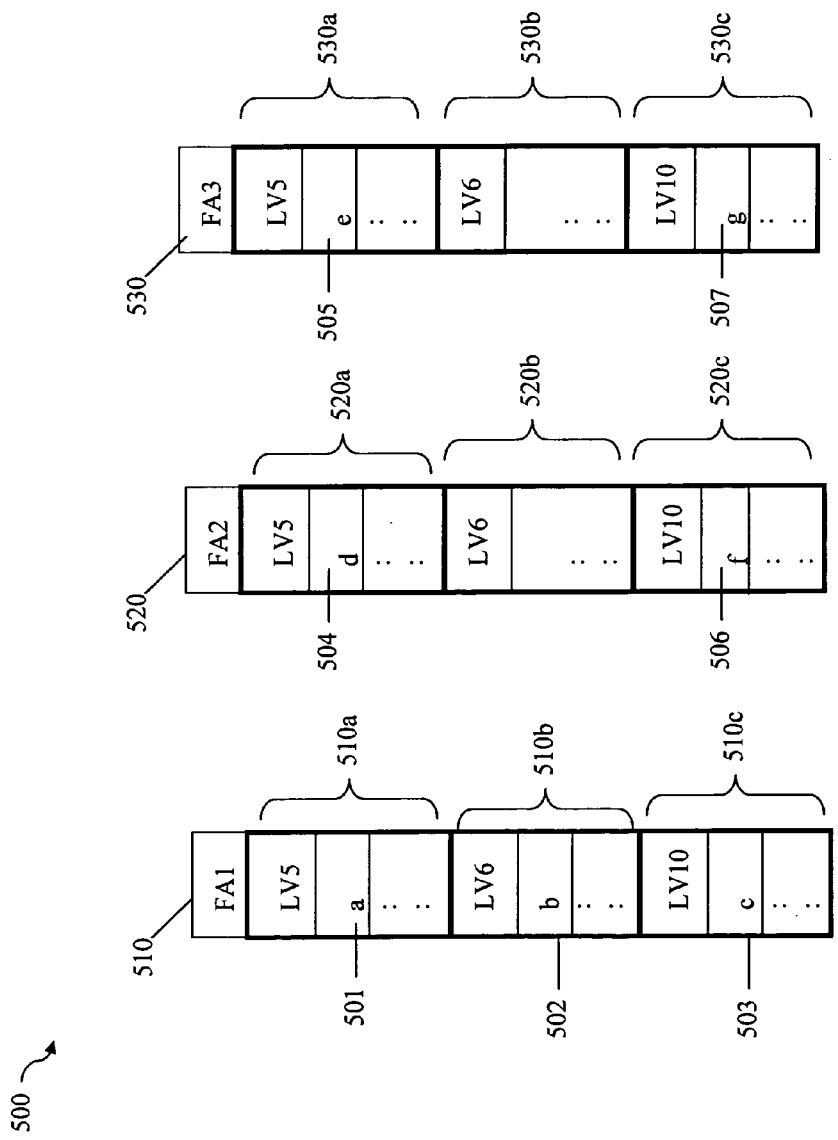
FIG. 7 is an example representation of queues of the data storage system including commands for received I/O operations of FIG. 6A.

Referring to FIG. 7, shown is an example illustrating the I/O queues of the FAs of the data storage system in accordance with techniques herein. The example 500 represents the state of the I/O queues after the I/O requests have been transmitted to the data storage system and while such I/O requests are still outstanding and waiting to be further processed by the data storage system. Element 510 may represent the I/O queues for FA1 for each LV of the metadevice. Element 510a represents the I/O requests received by FA1 for LV5 on LV5's I/O queue. Element 510b represents the I/O requests received by FA1 for LV6 on LV6's I/O queue. Element 510c represents the I/O requests received by FA1 for LV10 on LV10's I/O queue. Element 520 may represent the I/O queues for FA2 for each LV of the metadevice. Element 520a represents the I/O requests received by FA2 for LV5 on LV5's I/O queue. Element 520b represents the I/O requests received by FA2 for LV6 on LV6's I/O queue. Element 520c represents the I/O requests received by FA2 for LV10 on LV10's I/O queue. Element 530 may represent the I/O queues for FA3 for each LV of the metadevice. Element 530a represents the I/O requests received by FA3 for LV5 on LV5's I/O queue. Element 530b represents the I/O requests received by FA3 for LV6 on LV6's I/O queue. Element 530c represents the I/O requests received by FA3 for LV10 on LV10's I/O queue.

As illustrated and described above, round robin rotation may be performed per metadevice member or extent in order to perform load balancing by distributing I/O requests directed to the metadevice member over the possible I/O request transmission paths. The foregoing techniques provide for evenly distributing I/O requests for a metadevice so as to efficiently utilize I/O queues that may be maintained by each FA for each metadevice member.

In connection with metadevices, a data storage system may store metadevice data for a given host LBA in a non-striped mode as described above. For example, the metadevice logical address space from the host's view point may be mapped sequentially to the LVs forming the metadevice as described and illustrated in FIG. 4. In such an embodiment with a metadevice operating in non-striped mode, the path selection component 106 of FIG. 2 may perform processing to determine, for an I/O operation, a metadevice member to which the I/O operation is directed. The path selection component may determine the foregoing metadevice member using the mapping information as described and illustrated above, for example, in FIGS. 4 and 6B. An embodiment may also provide for operation of a metadevice in a striped mode where data of the metadevice may be striped across metadevice members. It should be noted that this striping may refer to how a metadevice logical address as used by a host (e.g., host LBA for a metadevice of 210) is mapped to a corresponding metadevice logical address as used by the data storage system (e.g., metadevice member and offset of LBA within the member of 220). The foregoing striping used in connection with mapping a metadevice logical address may be performed in addition to, and independent of, any underlying striping as may be performed for data protection purposes such as in connection with a RAID technique that may be performed on the data storage system.

Figure 8:
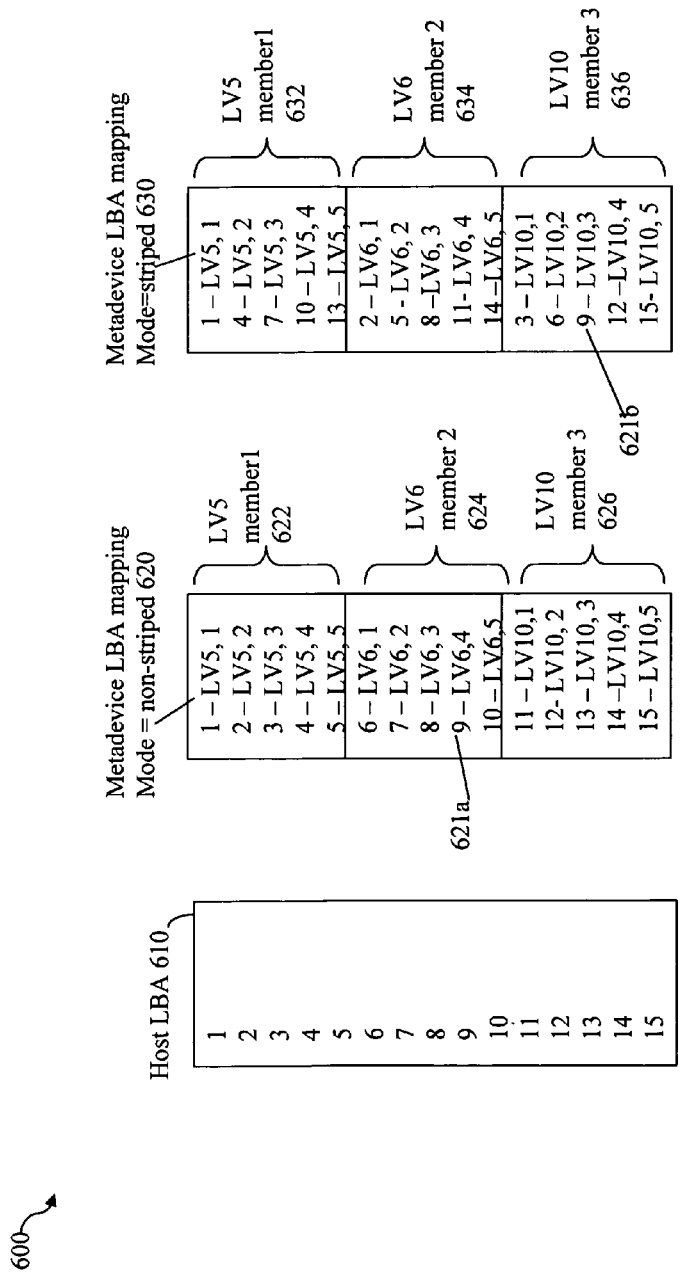
FIG. 8 is an example illustrating mapping for non-striped and striped metadevices in accordance with the techniques herein.

Referring to FIG. 8, shown is an example illustrating a metadevice logical address mapping in accordance with techniques herein for striped mode and non-striped mode. The example 600 includes a table 610 describing a host LBA range for a metadevice, table 620 indicating a mapping for non-striped mode and table 630 indicating a mapping for striped mode. Each element of 620 and 630 has a format of "host logical address"—"data storage system logical address" wherein the host's logical address (e.g., "host logical address") is mapped to a corresponding data storage system's logical address (e.g., "data storage system logical address"). In this example, the metadevice includes members or extents LV5, LV6 and LV10 as described above. However, for further simplicity in illustration, each metadevice member is illustrated as having 5 logical blocks providing for a total metadevice capacity and host LBA address range of 15. Element 610 represents a host LBA as may be specified in an I/O request directed to the metadevice.

Element 620 represents the mapping of the host LBA to a metadevice member and LBA or offset within the member when the mode for the metadevice is non-striped. The mapping of 620 reflects that as described above and illustrated, for example, with FIGS. 4 and 6B. For example, element 621a of table 620 indicates that a host logical address for the metadevice=host LBA 9 maps to a corresponding data storage system metadevice logical address of metadevice member=LV6, LBA or offset=4 (e.g. offset or LBA within the member LV6).

Element 630 represents the mapping of the host LBA to a metadevice member and LBA or offset within the member when the mode for the metadevice is striped. For example, element 621b of table 630 indicates that a host logical address for the metadevice=host LBA 9 maps to a corresponding data storage system metadevice logical address of metadevice member=LV10, LBA or offset=3 (e.g. offset or LBA within the member LV6). As represented by 630, host LBAs are mapped or striped sequentially across metadevice members or extents.

For a metadevice operating in a striped mode such as illustrated by 630 where, as described above, 1-based addressing is used and each metadevice member or extent has a same storage capacity, the determination of the "member id" from the host LBA may be represented as:

Member id=MODULUS ((Host LBA−1)/#members in metadevice))+1 where

"member id" is the metadevice member or extent identifier of 1, 2 or 3 corresponding, respectively, to member LVs 5, 6 and 10;

"#members in metadevice" represents the number of metadevice members or extents; and MODULUS is as described above and represents the integer value of the remainder of the indicated division operation.

The determination of the LBA or offset within the "member id" for striped metadevices may be generally represented as:

INT_QUOTIENT ((Host LBA−1)/#members in metadevice))+1 where

"INT_QUOTIENT" is as described above and represents the integer portion of the quotient for the indicated division operation.

In a manner similar to that as described above in connection with non-striped metadevices, the mapping of a host LBA to a corresponding metadevice member and offset or LBA within the member may also be generalized to account for variations from that as described herein such as, for example, having metadevice members of differing storage capacities.

It should be noted that an embodiment may use a striped metadevice in accordance with an expected locality of reference for data operations performed on the metadevice. Locality of reference may be characterized as describing a principle where "related" storage locations are frequently accessed. Storage locations may be "related" in a variety of different ways. In connection with striped metadevices, it may be expected that data which is located sequentially may be accessed sequentially, such as in ascending order. As such, data may be sequentially striped or spanned across different metadevice members so that when accessing a current data block stored on a first LV, a next sequential data block may be accessed using resources associated with a second LV different than the first LV. It should be noted that an embodiment may include one or more other modes for striping and mapping data across metadevice members depending on expected data access patterns.

As a variation to the foregoing, an embodiment may also have the path selection component 106 perform path selection using a weighted round robin technique. The path selection may be weighted to use a preferred path where the weight given to the preferred path affects the frequency with which the preferred path is selected or rotated through in a round robin fashion. In one embodiment as described above, all possible paths may have a same associated access cost when performing round robin path selection. As a variation to the foregoing, an embodiment may have differing costs associated with one or more of the possible paths from which a selection is made. As such, the cost associated with a path may be used as a weight affecting the frequency with which the path is selected from the possible paths. What will now be described is one example of when a weighting factor may be associated with one or more paths from with a selection is made for transmitting an I/O operation.

Figure 9:
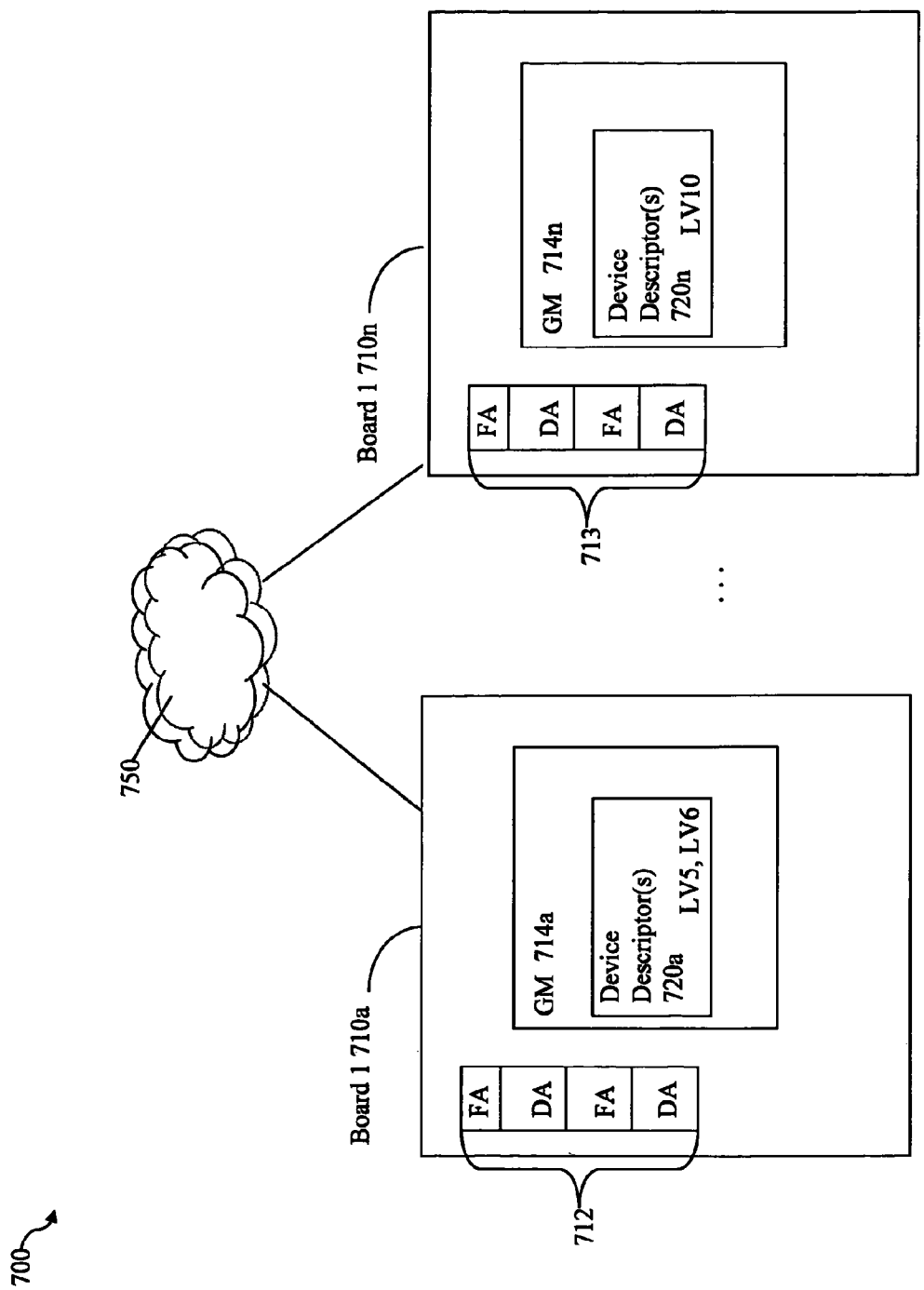
FIG. 9 is an example illustrating distribution of components and global memory portions on a plurality of boards as may be included in a data storage system in accordance with techniques herein.

Referring to FIG. 9, shown is an example of director boards as may be included in an embodiment in accordance with techniques herein. In this example 700, the data storage system may include a plurality of director boards 710a-710n. Each of the boards 710a-710n may be a physical board including components thereon as illustrated. In particular, each of the boards may include one or more directors and a portion of global memory so that global memory may be distributed across multiple director boards. For example, board 710a may include a plurality of directors 712 of the same or different director types (e.g., all DAs, all FAs, or both DAs and FAs illustrated directors of different types). Board 710a may also include a portion of global memory (GM) 714a. Stored in GM 714a may be information, such as device descriptors 720a, accessed and used by directors and other components of board 710a as well as other components of other boards, such as 710n. The boards 710a-710n may communicate over a fabric 750 to access global memory. The fabric 750 may include, for example, a switch and connections between the switch and boards 710a-710n. Device descriptors of 720a and 720n may contain information used by an FA or other director when performing I/O operation processing directed to a particular LV. For example, device descriptor information may identify whether the device is online or ready. The device descriptor information may also include information for each track of the device such as, for example, whether data from the track is in cache, whether data for the track stored in cache is write pending, and the like.

In connection with the foregoing, a device descriptor for each logical device or LV may be stored within global memory of the data storage system. However, since the global memory is distributed across multiple director boards, each device descriptor stored in global memory may physically reside on a single director board. As such, the cost for a director, such as an FA, to access a particular device descriptor in global memory may vary depending on whether the particular device descriptor is located in a global memory portion residing on the same physical board as the requesting FA or a different physical board. If the requesting FA is located on the same physical board as the global memory portion containing the desired device descriptor, then the cost for the FA to access the desired device descriptor is less than the cost (e.g., access time and resources) would be for the same FA to access a descriptor located in a global memory portion on a different physical board. For example, assume the metadevice 130 of FIG. 3 is as described above and includes LV5, LV6 and LV10. The device descriptors for LV5 and LV6 may be located in GM portion 714a and the device descriptor for LV10 may be located in GM portion 714n. As such, cost associated with a first FA of 712 accessing device descriptors for LV5 and LV6 (in 720a) is less than a cost associated with a second FA of 713 accessing device descriptors for LV5 and LV6 since the second FA of 713 communicates over the fabric 750 to access the device descriptors included in 720a. As such, an embodiment may determine a path as "preferred" for a particular metadevice member or LV based on whether the LV's device descriptor information is stored in a global memory portion residing on the same physical board as the FA of the path. For example, any path using an FA of 712 may be considered preferred with respect to accessing metadevice members LV5 and LV6 since the device descriptors for LV5 and LV6 reside in 720a on GM portion 714a. Similarly, any path using an FA of 713 may be considered preferred with respect to accessing metadevice member LV10 since LV10's device descriptor resides in 720n of GM portion 714n. Thus, a path may be considered preferred based on whether the FA of the path may access device descriptor information stored locally, or on the same board as the FA.

In accordance with techniques herein and with reference back to FIG. 3, an embodiment may have the host 102 perform discovery processing to obtain configuration and other information as used and described herein. For example, each FA of the data storage system 120 may return information to the host 102 regarding which devices of 102 are accessible or visible to the host on which path(s), device information such as device capacity, whether a device is a metadevice, which LVs are members of the metadevice, capacity information for each metadevice member, information identifying which host LBA ranges correspond to which metadevice members, which device descriptor tables are stored on which physical boards, which FAs are stored on which physical boards, and the like. Such information may be returned to the host, for example, in response to SCSI inquiry and/or other commands.

In an embodiment in accordance with techniques herein, the path selection component 106 may receive and use information regarding which FAs and device descriptor information (as stored in distributed global memory portions) are located on the same physical boards. Using this information, the path selection component 106 may determine which one or more paths (and FAs of those paths) are preferred for use with which one or more LVs of a metadevice. As such, the component 106 may use any one of a variety of different techniques to weight or increase the frequency with which a path is selected from multiple possible paths. With respect to selecting a first path from a plurality of paths for use when transmitting an I/O operation for an LV accessible over the plurality of paths, the component 106 may increase the frequency with which the first path is selected when the FA of the first path resides on the same physical board as the LV's device descriptor information (e.g., where the LV device descriptor information is stored in a global memory portion on the same physical board on which the FA of the first path resides). For example, with reference back to FIG. 3, the path selection component 106 may determine that a first path defined by A1-B1 and using FA1 122a is preferred for I/O operations directed to LV5 because LV5's device descriptor information resides on the same physical board as FA1-122a. Although I/O operations for LV5 may also be directed over a second path (denoted by A2-B2 using FA2 122b) and also over a third path (denoted by A3-B3 using FA3 122c), the first path may be preferred due to the locality of LV5's device descriptor information and FA122a being located on the same physical board. In this case, the path selection component 106 may increase the frequency or weight associated with selecting the first path when transmitting I/O operations directed to metadevice member LV5. For example, rather than assign an equal weight of 1/3 to each of the three paths, the component 106 may assign a higher weight to the first path than to second and third paths. To further illustrate, an embodiment may assign, for example, assign 2/3 or 4/6 to the first path and 1/6 to each of the second path and third path so that 4/6 I/O requests for metadevice member LV5 are sent over the first path, 1/6 I/O requests for metadevice member LV5 are sent over the second path, and 1/6 I/O requests for metadevice member LV5 are sent over the third path. The foregoing weight or frequency for a path represented as "n/m" indicates that "n" out of every "m" I/O requests for metadevice member LV5 are routed over the path. Thus, the weight or frequency of the path may indicate the weighted round robin rotation for that path with respect to other available possible paths. The weighting may be performed, more generally, with respect to any other criteria for path selection and load balancing that may be used in an embodiment. As described elsewhere herein, round robin is only one particular load balancing technique that may be used in an embodiment.

An embodiment may use other techniques and factors that may vary with each embodiment in order to determine a path weighting used in path selection for a metadevice member. For example, for a first metadevice member, each of the plurality of paths over which a metadevice is accessible may have a corresponding time indicating when each path was last used in transmitting a data operation for the first metadevice member. The step of selecting a path for transmitting a data operation for the first metadevice member may select one of said plurality of paths in accordance with criteria including an ordering of the plurality of paths based on a relative ordering of the corresponding times for the plurality of paths, and also a weight associated with each of the paths. The weight may be determined in accordance with the first metadevice member, such as based on a cost associated with the receiving FA of the path obtaining device information for the first metadevice member. The weight for each path may also vary for each metadevice member and associated cost of using that path for that particular metadevice member. Based on the foregoing, the ordering of the plurality of paths may represent information that may be used for round robin selection. In connection with round robin where all path weights are the same, if each path has a time stamp or indicator as to the last time the path was selected for use with the first metadevice member, the path having the earliest such corresponding time of all the paths may be selected. When the criteria also includes a weight for each path and all path weights are not the same, the weight may affect the relative frequency with which a path is selected so that one or more of the paths are selected more frequently than others of the paths.

It should be noted that the examples described herein may be based on one or more simplifications for purposes of illustration of the techniques for path selection. For example, the foregoing description assumes that the unit size for an LBA is the same size as a unit for metadevice striping, that each metadevice member has a same storage capacity or size, and the like. It will be appreciated by those skilled in the art that the techniques herein may be applied in connection with variations of the descriptions herein.

Using the techniques herein, an embodiment may use a path selection component which performs meta-device member-based load balancing for metadevices. An example of such a technique provided herein for purposes of illustration is round robin. It will be appreciated by those skilled in the art that the techniques herein for load balancing and performing path selection per metadevice member independently with respect to each metadevice member may more generally be used with techniques other than round robin. For example, an embodiment may use other load balancing techniques and criteria which may be characterized as adaptive and consider one or more factors for each path that dynamically change over time such as described, for example, in U.S. Pat. No. 6,434,637, Aug. 13, 2002, D'Errico, (the '637 patent) which is incorporated by reference herein. As described in the '637 patent, criteria considered may relate to characteristics of queued I/O operations on each path (e.g., such as a number of queued I/O operations to be transferred over each path, a number of data blocks to be transferred by the collection of queued I/O operations for each path), one or more times associated with each path (e.g, such as expected data access time for each path), and the like. In the '637 patent, such criteria regarding queued I/O operations are with respect to the host or sender of the I/O operation. In accordance with techniques herein, an embodiment may perform load balancing and path selection per metadevice member independently with respect to each metadevice member using such criteria as described in the '637 patent. For example, for a metadevice member, an embodiment may select one of a plurality of paths for an I/O operation directed to the metadevice member based on the number of currently queued I/O operations for each path which are directed to the metadevice member. It should be noted that the weighting described in the '637 patent with the adaptive load balancing techniques provides for selecting a path which tends to have a lower weight than other paths. This is in contrast with the weighting described elsewhere herein which provides for increased frequency or likelihood of a path being selected if the path has a higher weight relative to other possible paths.

Metadevices in an embodiment in accordance with techniques herein may be non-striped or striped. The load balancing may also optionally use preferred paths based on a path weighting where each of the paths do not have a same weight. For example, an embodiment in accordance with techniques herein may perform a round robin technique for load balancing each metadevice member independently in order to rotate through all paths over which the metadevice is accessible (per metadevice member). The embodiment may also have a weight associated with each path that may vary in accordance with the particular metadevice member. The weight associated with each path may not be the same. The weighting factor for each path generally affects the frequency with which each path is selected relative to other available paths when performing path selection with load balancing independently for each metadevice member.

The state information used in connection with a round robin technique for path selection and load balancing may have any one of a variety of different forms. One example of the state information is illustrated in FIG. 6B. An embodiment using one of the round robin techniques described herein performed per metadevice member may be characterized as determining that a data operation is for a first of the plurality of metadevice members, and selecting a first of a plurality of paths over which the metadevice is accessible. The step of selecting a path using the round robin technique having equal path weights (e.g, described in connection with FIGS. 6, 6B and 7) may be characterized as using a load balancing technique that selects the first path in accordance with criteria including when each of the plurality of paths was most recently used, or last used, in transmitting data operations for the first metadevice member and without considering any information concerning paths selected in connection with transmitting data operations to other metadevice members. For example, the first path may be selected without considering which of the plurality of paths were used in transmitting data operations for others of the metadevice members. Furthermore, each of the plurality of paths over which the metadevice is accessible may have a corresponding time indicating when each such path was last used in transmitting a data operation for the first metadevice member. In accordance with path selection for the first metadevice member using a round robin load balancing technique with equal path weights, the path selected may be the one having an earliest such corresponding time of all the paths over which the metadevice is accessible. In other words, a time interval may be determined for each of the possible paths where the time interval for a path is the difference between the current time and the last time the path was selected for transmitting an I/O operation for the first metadevice member. The path selected from the plurality of possible paths when transmitting a next I/O operation directed to the first metadevice member is the one which has a largest such time interval with respect to all possible paths. The path weights may affect the frequency with which one path is selected relative to other paths. In one embodiment, a first path having a higher weight than other possible paths may indicate that the first path is preferred over the other possible paths. Thus, in such an embodiment using weights in the criteria for path selection with round robin where path weights may not be equal, one path having a higher weight may be selected more frequently than other paths having lesser weights. The criteria used in connection with performing path selection may relate, for example, to resources, performance, and the like, of the data storage system and/or host (e.g., or other entity sending an I/O operation to the data storage system) as well as characteristics of the different connections used for transmitting the I/O operation.

Figure 10:
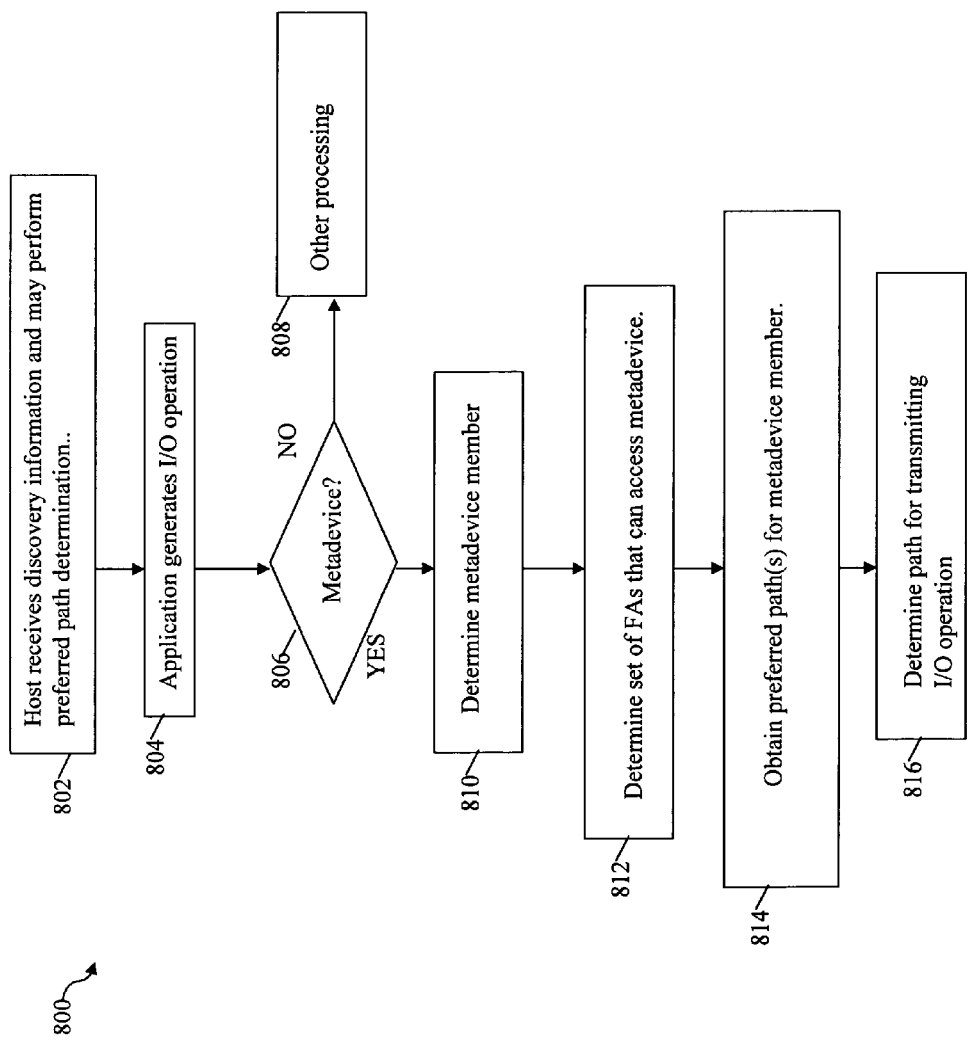
FIG. 10 is a flowchart of processing steps that may be performed in an embodiment in accordance with techniques herein for path selection.

Referring to FIG. 10, shown is a flowchart of processing steps that may be performed in an embodiment in accordance with techniques herein. The steps of 800 summarize processing as described above. At step 802, the host receives discovery information. The discovery information may include information regarding metadevice configuration (e.g., which members are included in a metadevice and information on each such member), which LV device descriptor information is stored on which physical board, which director(s) are stored on which physical board, and the like. Step 802 may also include performing preferred path determination for metadevice members. As described herein, a path for a metadevice member may be determined as preferred for use in connection with sending I/O requests from the host to the metadevice member. The criteria used for determining which one or more paths, and associated FAs, are preferred for the member may vary with embodiment. For example, a path may be preferred if the device descriptor information for the metadevice member is located on the same physical board as the FA included in the path. At step 804, sometime later, an application generates one or more I/O operations. At step 806, when processing the I/O operation, a determination is made by a component on the host (e.g., the path selection component 106) as to whether the I/O operation is directed to a metadevice. If not, control proceeds to step 808 to perform other processing. Step 808 may include performing other processing for path selection as generally represented in step 816. If step 806 evaluates to yes, control proceeds to step 810 to determine the particular metadevice member or LV to which the I/O operation is directed. As described above, step 810 may be performed using a mapping technique that may vary with whether the metadevice is striped or non-striped. For example, for a non-striped metadevice, an embodiment may map the metadevice logical address as used by the host to another metadevice logical address as used by the data storage system. Such mapping is described, for example, in connection with FIGS. 4 and 6B. For a striped metadevice, an embodiment may use mapping as described and illustrated in table 630 of FIG. 8. At step 812, a determination is made as to the set of FAs and associated paths that can be used to access the metadevice. At step 814, an embodiment may obtain preferred path information (as determined in connection with step 802) for the metadevice member (as determined in step 810). At step 816, a path is selected for use in transmitting the I/O operation from the host to the data storage system. The path may be selected from the multiple possible paths of step 812. An embodiment may use the weighting technique described herein for preferred paths and may associate a weight with each path of the set determined in step 812 where the weight affects the frequency with which a path is selected. As described herein, preferred path determination and use in path selection may be optionally performed in an embodiment. An embodiment which does not use preferred paths may also be characterized as having paths with equal paths weights. Exemplary weighting and associated path weighting criteria is described herein such as in connection with FIG. 9 although other weighting criteria may be used in an embodiment in accordance with techniques herein. It should be noted that although the preferred path determination is included in step 802, preferred path determination may also more generally be performed at other points in time, such as prior to step 814, and then used in connection with processing multiple subsequent I/Os directed to the same metadevice member.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing path selection comprising:
performing discover processing by an entity that sends data operations to a data storage system, said discovery processing including the entity receiving configuration information from a data storage system, said configuration information including first information about a metadevice, said first information including information identifying a plurality of metadevice members included in the metadevice and information identifying which logical address ranges of the metadevice correspond to which metadevice members;
performing first processing by said entity for sending a data operation to the data storage system whereby the data operation is directed to the metadevice comprising the plurality of metadevice members, said first processing including:
determining, using the configuration information, a first of the plurality of metadevice members to which the data operation is directed;
performing, in accordance with a load balancing technique for the first metadevice member, path selection to select a first of a plurality of paths, wherein the metadevice is accessible to said entity over each of the plurality of paths; and
sending the data operation over the first path from said entity to the data storage system.

2. The method of claim 1, wherein the load balancing technique performs load balancing for each of the plurality of metadevice members independent of all others of said plurality of metadevice members.

3. The method of claim 2, wherein the load balancing technique performs any of round robin selection and adaptive load balancing for each metadevice member, wherein said adaptive load balancing for said each metadevice member includes one or more criteria related to a characteristic of queued I/O operations directed to said each metadevice member on each path.

4. The method of claim 1, wherein data stored on the metadevice is not striped across the plurality of metadevice members.

5. The method of claim 1, wherein data stored on the metadevice is striped across the plurality of metadevice members.

6. The method of claim 1, wherein each of the plurality of metadevice members are logical volumes.

7. The method of claim 1, further comprising:
determining one or more preferred paths from the plurality of paths for at least one of the plurality of metadevice members.

8. The method of claim 7, wherein each of said one or more preferred paths for said at least one metadevice member is selected for transmitting a data operation to the at least one metadevice member more frequently than others ones of said plurality of paths which are not included in said one or more preferred paths.

9. The method of claim 8, wherein at least one of said one or more preferred paths includes a director located on a same physical board as device descriptor information for said at least one metadevice member.

10. The method of claim 9, wherein the device descriptor information is stored in a portion of global memory located on the same physical board as the director.

11. The method of claim 9, wherein the director and metadevice are included in a data storage system.

12. The method of claim 1, wherein the entity is a host and the data operation includes a first logical address representing a logical address used by the host, and the method further comprising:
mapping, by the host prior to the host performing said sending, said first logical address to a second logical address, said second logical address being used by the data storage system and identifying said first metadevice member and an offset in said first metadevice member.

13. The method of claim 12, wherein said data operation is received by a director of the data storage system included in the first path and the director places the data operation in a command queue associated with the first metadevice member.

14. The method of claim 1, wherein the load balancing technique uses criteria in selecting said first path, said criteria including which of said plurality of paths were previously used in sending data operations directed to said first metadevice member.

15. The method of claim 14, wherein said first path is selected without considering which of said plurality of paths were previously used in sending data operations directed to others of said plurality of metadevice members.

16. The method of claim 14, wherein said criteria includes a weight associated with each of said plurality of paths.

17. The method of claim 1, wherein path selection of said first path for transmitting said data operation for said first metadevice member is performed independently of path selection in accordance with said load balancing technique to select one of said plurality of paths for transmitting a data operation for a second of the plurality of metadevice members.

18. A non-transitory computer readable medium comprising code stored thereon for performing path selection, the non-transitory computer readable medium comprising code for:
performing discovery processing by an entity that sends data operations to a data storage system, said discovery processing including the entity receiving configuration information from a data storage system, said configuration information including first information about a metadevice, said first information including information identifying a plurality of metadevice members included in the metadevice and information identifying which logical address ranges of the metadevice correspond to which metadevice members;
performing first processing by said entity for sending a data operation to the data storage system whereby the data operation is directed to the metadevice comprising the plurality of metadevice members included in the data storage system, said first processing including:
determining, using the configuration information, that the data operation is directed to a first of the plurality of metadevice members;
selecting a first of a plurality of paths over which the metadevice is accessible to said entity, wherein said selecting is performed using a load balancing technique that selects said first path in accordance with criteria including when each of said plurality of paths was last used in transmitting data operations for the first metadevice member, wherein said selecting of the first path for the data operation directed to the first metadevice member is performed without considering which of said plurality of paths were used in transmitting data operations for others of said metadevice members; and
sending the data operation over the first path from said entity to the data storage system.

19. The non-transitory computer readable medium of claim 18, wherein each of said plurality of paths has a corresponding time indicating when said each path was last used in transmitting a data operation for said first metadevice member and said criteria includes an ordering of said plurality of paths based on a relative ordering of the corresponding times for said plurality of paths and a weight associated with each of said paths, said weight being determined in accordance with said first metadevice member.

20. A system comprising:
a data storage system including a metadevice comprising a plurality of metadevice members; and
a host including a processor and including a non-transitory computer readable medium with code stored thereon for:
performing discovery processing by the host, said discovery processing including the entity requesting and receiving configuration information from the data storage system, said configuration information including first information about the metadevice, said first information including information identifying a plurality of metadevice members included in the metadevice and information identifying which logical address ranges of the metadevice correspond to which metadevice members;
performing first processing by the host for sending a data operation to the data storage system whereby the data operation is directed to the metadevice, said first processing including:
determining, using the configuration information, that the data operation is directed to a first of the plurality of metadevice members;
performing path selection to select a first of a plurality of paths over which the metadevice is accessible to the host, wherein said path selection uses a load balancing technique that selects said first path in accordance with when each of said plurality of paths was last used in transmitting data operations for the first metadevice member to the data storage system and without considering which of said plurality of paths were used in transmitting data operations for others of said metadevice members to the data storage system; and
sending the data operation over the first path from the host to the data storage system.

* * * * *